United States Patent
Mennink (12)

(10) Patent No.: US 6,452,684 B1
(45) Date of Patent: Sep. 17, 2002

(54) DEVICE FOR DETERMINING THE CONTOUR OF A ROAD SURFACE

(75) Inventor: Jan Mennink, Deventer (NL)

(73) Assignee: Road Ware B.V., An Apeldoorn (NL)

( * ) Notice: Subject to any disclaimer, the term of this patent is extended or adjusted under 35 U.S.C. 154(b) by 0 days.

(21) Appl. No.: 09/719,122

(22) PCT Filed: Jun. 3, 1999

(86) PCT No.: PCT/NL99/00346

§ 371 (c)(1),
(2), (4) Date: Dec. 8, 2000

(87) PCT Pub. No.: WO99/64681

PCT Pub. Date: Dec. 16, 1999

(30) Foreign Application Priority Data

Jun. 10, 1998 (NL) .............................................. 1009364

(51) Int. Cl.[7] ............................................. G01B 11/24
(52) U.S. Cl. ........................ 356/601; 356/608; 356/303; 356/3.07
(58) Field of Search ................................ 356/601, 608, 356/606, 603, 4.08, 141.3; 33/287, 86; 104/7.1; 404/84.05; 250/559.19, 559.22

(56) References Cited

U.S. PATENT DOCUMENTS

| | | | | |
|---|---|---|---|---|
| 4,065,856 A | | 1/1978 | Waters | 33/287 |
| 4,203,665 A | * | 5/1980 | Boulais | 356/4 |
| 4,456,829 A | * | 6/1984 | Fohey | 250/260 |
| 4,653,316 A | * | 3/1987 | Fukuhara | 73/146 |
| 4,781,465 A | * | 11/1988 | Demachi et al. | 356/371 |
| 4,796,998 A | * | 1/1989 | Soma et al. | 356/376 |
| 4,922,752 A | * | 5/1990 | Kitazume et al. | 73/146 |

* cited by examiner

Primary Examiner—Hoa Q. Pham
(74) Attorney, Agent, or Firm—Michael D. Bednarek; Shaw Pittman LLP

(57) ABSTRACT

Device for determining a desired contour of a ground surface, for instance a road surface, relative to the actual contour of that ground surface, at least comprising measuring unit for generating along a determined distance from a ground surface actual values for the height and position of a number of points of that ground surface relative to a determined reference point, wherein the measuring unit comprise a laser light source which can be placed at a measuring point above the ground surface and which is adapted to generate a laser beam moving over the determined distance from the ground surface, sensor for detecting the laser beam reflected by the ground surface to the measuring point, time-measuring unit for determining the transit time of said laser beam between the laser light source and the sensor, and processing system for generating from signals from the laser light source, the sensor and the time-measuring unit of actual values for the height and the position of a number of points of this ground surface relative to the measuring point, and for calculating from these actual values of values for height and position of a number of points on a desired contour of this ground surface.

4 Claims, 7 Drawing Sheets

DEVICE FOR DETERMINING THE CONTOUR OF A ROAD SURFACE

The invention relates to a device for determining a desired contour of a ground surface, for instance a road surface, relative to the actual contour of that ground surface, at least comprising measuring means for generating along a determined distance from a ground surface actual values for the height and position of a number of points of that ground surface relative to a determined reference point.

BACKGROUND

Such a device for determining the contour of a road surface is known for the purpose of applying a new top layer of for instance asphalt or asphalt concrete, wherein use is made of a so-called multi-foot ski. A multi-foot ski comprises a number of flat plates or feet, two of which are mounted pivotally in each case on an elongate first arm which, using a second elongate arm, is in turn pivotally coupled at a point in the middle to a following first arm on which two feet are also pivotally mounted. Using a third elongate arm the second elongate arm is pivotally coupled at a point in the middle to a corresponding subsequent second arm, wherein all arms extend in the same direction. During asphalting operations a multi-foot ski is dragged by an asphalt spreading machine alongside this machine over a strip of road surface adjacent to the part of this road surface which is to be asphalted. The height of the middle of a first arm of the multi-foot ski relative to a measuring point on the asphalt spreader is determined by the average height of the respective feet under this first arm. The height of the middle of a second arm of the multi-foot ski relative to the measuring point on the asphalt spreader is determined by the average height of the middles of the respective first arms under this second arm. The height of the middle of the third arm of the multi-foot ski relative to the measuring point on the asphalt spreader is determined by the average height of the middles of the respective second arms under this third arm. Situated on the asphalt spreader at the measuring point is a height sensor, for instance an ultrasonic transmitter/receiver combination, which measures the height of the middle of the third arm and thereby the average height of all feet in the multi-foot ski. In this way an average value progressing in lengthwise direction of the road surface is obtained for the height of this road surface, wherein abrupt transitions in height, resulting for instance from damage to the road surface, are averaged out. This average value is entered into a control circuit for a finishing beam which is dragged along over a newly laid asphalt layer in order to give this layer the desired thickness, wherein the effect of discontinuities in the underlying road surface is reduced by averaging.

U.S. Pat. No. 4,065,856 discloses an optical system for a reference datum in relation to which operations can be carrried out in roadway workings. This optical system comprises optical devices which define an optical triangle whose plane inclines downwardly towards the plane of the roadway. The inclination of the plane of the optical triangle is adjustable so that a corner of the triangle is set at the level of the roadway as determined by a reflected image of the roadway surface. The optical system comprise a light source, e.g. a laser, and a receiver, which both are carried by a table which is pivotally mounted on a roadway maintainance machine, in this case a conventional track lifting and ballast tamping machine. The table is mechanically coupled for vertical movement with a track lifting device. The emitted light beam reflects on the underground of a railway track and is swept over the underground by pivoting the table, until the reflected beam just falls in the middle of the detector. In this situation the lifting device is at its desired height to perform its function, after which the machine is moved forward and the described operation is repeated.

According to this prior art, the reference point for levelling a railway track is situated on a fixed distance in front of the machine. Modulations in the contour of the ground surface are thus reduced by a factor corresponding with the ratio of distances from the pivoting point to respectively the reference point and the point on the ground surface to be corrected.

According to the prior art it is not possible however to eliminate the effect of modulations in the ground surface, making this device not applicable in combination with e.g. an asphalt spreader, a grader or a scarifier.

DE-A-44 27 724 discloses a device for performing a trigonometric measurement of an angle-dependent variable, comprising a continuous laser, emitting its coherent light on a rotating mirror. In the range of the pivoting laser beam two detectors are provided: a reference detector and a distance detector, the signals of which are to be compared in a comparator, for calculating a rotation angle from the time differences.

DE-A-196 24 751 discloses a device for performing a transit time measurement with a continuous laser, emitting its light on a rotating mirror. The rotating mirror projects the laser beam on a position resolving detector for generating a signal from which transit time information is to be obtained.

The known contour-determining device with multi-foot ski has a number of drawbacks. Due to the mechanical suspension of the feet the measurement range of the measuring device which can be realized in practice is smaller than is desirable for a good insight into the contour of a road surface. Transport and assembly of the multi-foot ski are time-consuming, while during the disassembly required in respect of transport components are in practice quite often lost. Use of the multi-foot ski in a contour-measuring device is limited to a ground with a solid structure due to the required mechanical contact with a ground, so that the multi-foot ski is for instance unsuitable for measuring the contour of a sandy ground. In an asphalt spreader the multi-foot ski must necessarily always be placed just adjacently of the part of a road surface for asphalting so that only an approximation of the contour of the road surface for asphalting can be obtained. In practice the feet of the multi-foot ski are nevertheless found during asphalting to come into contact with and to be fouled with a freshly applied tacky layer, which may result in poor functioning and in any case requires additional maintenance.

The object of the invention is to provide a contour-measuring device which does not have these drawbacks.

SUMMARY OF THE INVENTION

This objective is achieved and other advantages gained with a device of the type stated in the preamble wherein according to the invention the measuring means comprise: a laser light source which can be placed at a measuring point above the ground surface and which is adapted to generate a laser beam moving over said determined distance from the ground surface, sensor means for detecting the laser beam reflected by the ground surface to the measuring point, time-measuring means for determining the transit time of said laser beam between the laser light source and the sensor means, in addition to processing means for generating from signals from the laser light source, the sensor means and the time-measuring means of actual values for the height and the position of a number of points of this ground surface relative to the measuring point, and for calculating from these actual values of values for height and position of a number of points on a desired contour of this ground surface.

The laser light source generates for instance a pulsed laser beam scanning a determined angular range which strikes the ground surface, is reflected and detected by the sensor means, wherein the transit time is directly proportional to the distance between light source and point on the ground surface. The position of the point on the ground surface can be precisely determined relative to the laser light source (the measuring point) from the angle at which the laser beam was transmitted and the determined distance.

With a contour-measuring device according to the invention it is possible to measure the contour of a ground surface in contact-free manner and to determine for each point on this ground surface a desired height which is determined by the actual height of that point and of a large number of nearby points on that ground surface, wherein the processing means correct for discontinuities in the values for the actual height of these points.

It is possible with a measuring device according to the invention to determine the desired contour on the basis of the actual height of a very large number of points in close succession over a relatively large range on the ground surface, while the number of points for determining an average height of a point using the known measuring device with a multi-foot ski is limited to the number of feet under this ski, wherein the total length of the ski moreover defines the range of the measurement.

In a contour-measuring device according to the invention the processing means are preferably adapted to replace an actual value for the height of a point with a substitute value if this actual value exceeds a predetermined threshold value.

With this preferred embodiment it is possible to determine the contour of a road surface for asphalting within the width range of an asphalt spreader, since incorrect information concerning the actual contour of the road surface, which can for instance result from reflection of the scanning laser beam on components of the asphalt spreader, are recognized and eliminated.

In an advantageous embodiment the processing means are adapted to separately calculate for each of the number of points on a desired contour of the ground surface the values for height and position of these points. The possibility of calculating for each of a discrete number of points on a desired contour the height relative to the corresponding actual point makes it possible, otherwise than in contour determination with a multi-foot ski, to make the desired contour while taking into account the occurrence of a variation over a short distance in the actual contour relative to the average contour measured over a longer distance. In particular it is possible to design a desired convex contour portion above an actual concave contour portion in a road surface. In a practical situation such a concave contour portion results from settling of the ground at that location. This settling of the ground can be taken into account during asphalting by depositing the asphalt layer in accordance with the designed convex contour, whereafter the asphalt undergoes a so-called postcompaction with the action of a roller thereover.

In yet another embodiment the contour-measuring device according to the invention comprises memory means for storing values for the actual position of a number of predetermined points of a ground surface and the predetermined value for the desired height of the-se points, and the processing means are adapted to calculate the value for a desired height of points located between these predetermined points compatible with this predetermined value for the desired height of these points.

BRIEF DESCRIPTION OF THE DRAWINGS

The invention will be elucidated hereinafter on the basis of embodiments and with reference to the drawings.

In the drawings.

DESCRIPTION OF THE INVENTION

Figure 1:
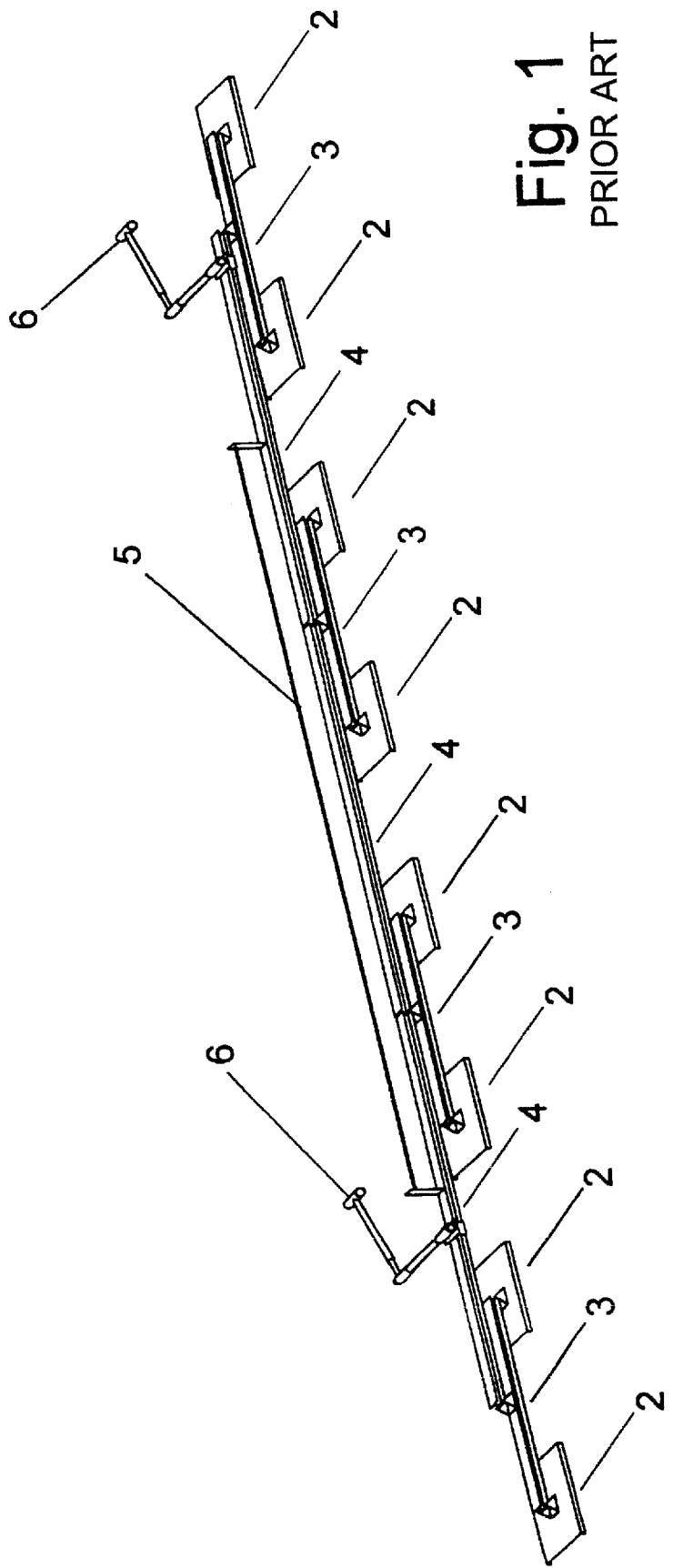
FIG. 1 shows a greatly simplified perspective view of a multi-foot ski according to the prior art.

Corresponding components are designated in the figures with the same reference numerals.

FIG. 1 shows a multi-foot ski 1 with eight feet 2, two of which are pivotally mounted in each case on a first arm 3. First arms 3 are mutually coupled for pivoting at a point in the middle using second arms 4. The two outermost second arms 4 are mutually coupled for pivoting at a point in the middle using a third arm (or wire connection) 5. Fixed to the outermost second arms 4 are dragging arms 6, by means of which multi-foot ski 1 can be dragged along over a ground. If the height of the eight feet 2 in a chosen coordinate system is given respectively by the values $z_1, z_2, \ldots, z_8$, it is then readily understood that the height of the middle of the third arm 5, with the exception of one constant, is given in first order of approximation by the average value $\frac{1}{8}(z_1+z_2+\ldots+z_8)$ of the heights of the individual feet 2. The length of a multi-foot ski is limited in practical situations to about 12 m.

Figure 2:
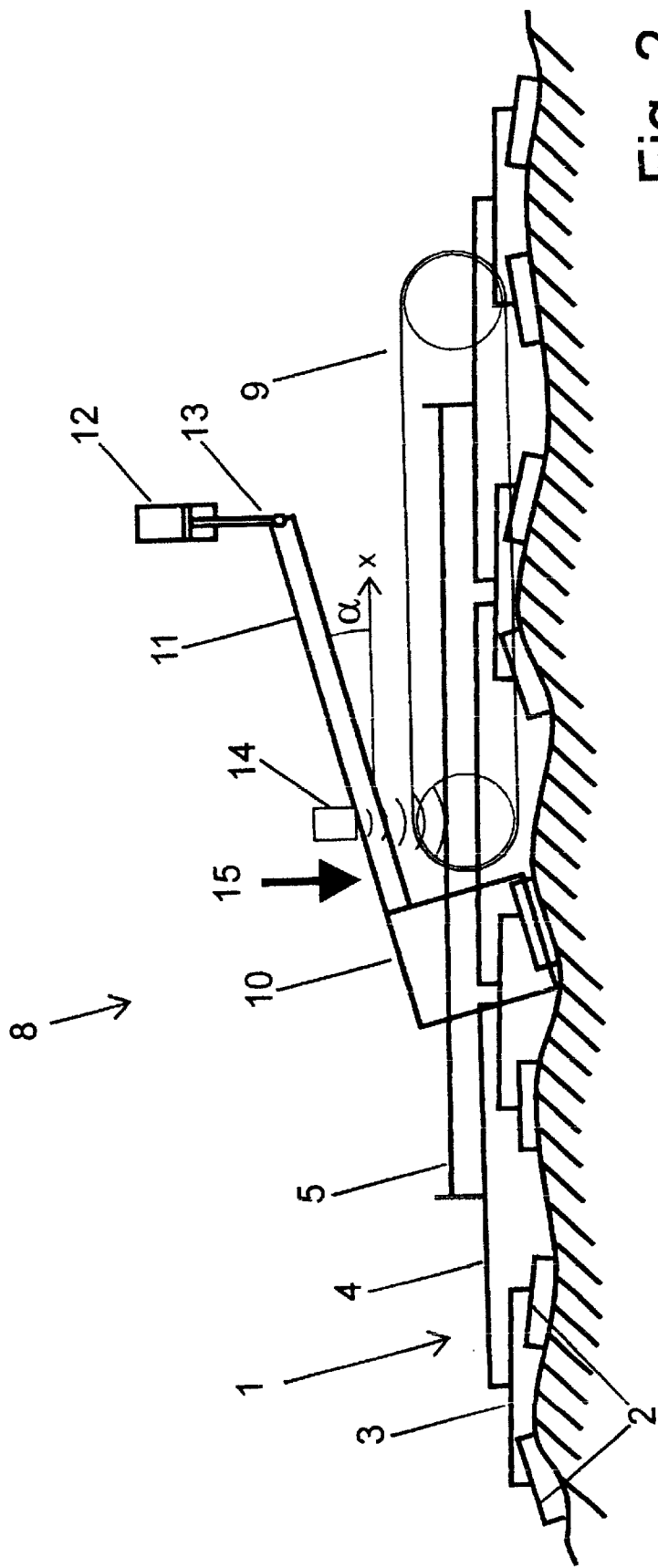
FIG. 2 shows schematically in side view the multi-foot ski of FIG. 1 in combination with an asphalt spreader.

FIG. 2 shows an application of multi-foot ski 1 of FIG. 1 in determining the contour of a road surface 7 which is being asphalted using a (schematically shown) asphalt spreader 8, of which are shown a caterpillar track 9, a finishing beam 10 fixed to a pivotable pulling arm 11, a hydraulic cylinder 12 with piston rod 13 which is coupled to pull rod 11 and a level meter 14 for measuring the height of the middle of third arm 5 of multi-foot ski 1 dragged along by asphalt spreader 8. In asphalt spreader 8 asphalt is deposited over the whole width of the machine (represented by arrow 15) just in front of finishing beam 10, whereby the asphalt is distributed evenly over the underlying road surface 7. In asphalting operations using the shown combination the average height of feet 2 is determined using level meter 14, for instance an ultrasonic tracer, by determining the height of the middle of third arm 5 of multi-foot ski 1. An output signal of level meter 14 corresponding to this latter height is fed to a control circuit (not shown), where a change in the signal from the level meter results in a control signal being transmitted to the drive of hydraulic cylinder 13 in order to effect a corresponding displacement of piston rod 14. As a consequence the angle α between pull rod 11 and the direction of movement x of spreading machine 8, and therewith the height of finishing beam 10 relative to road surface 7, is altered accordingly.

Figure 3:
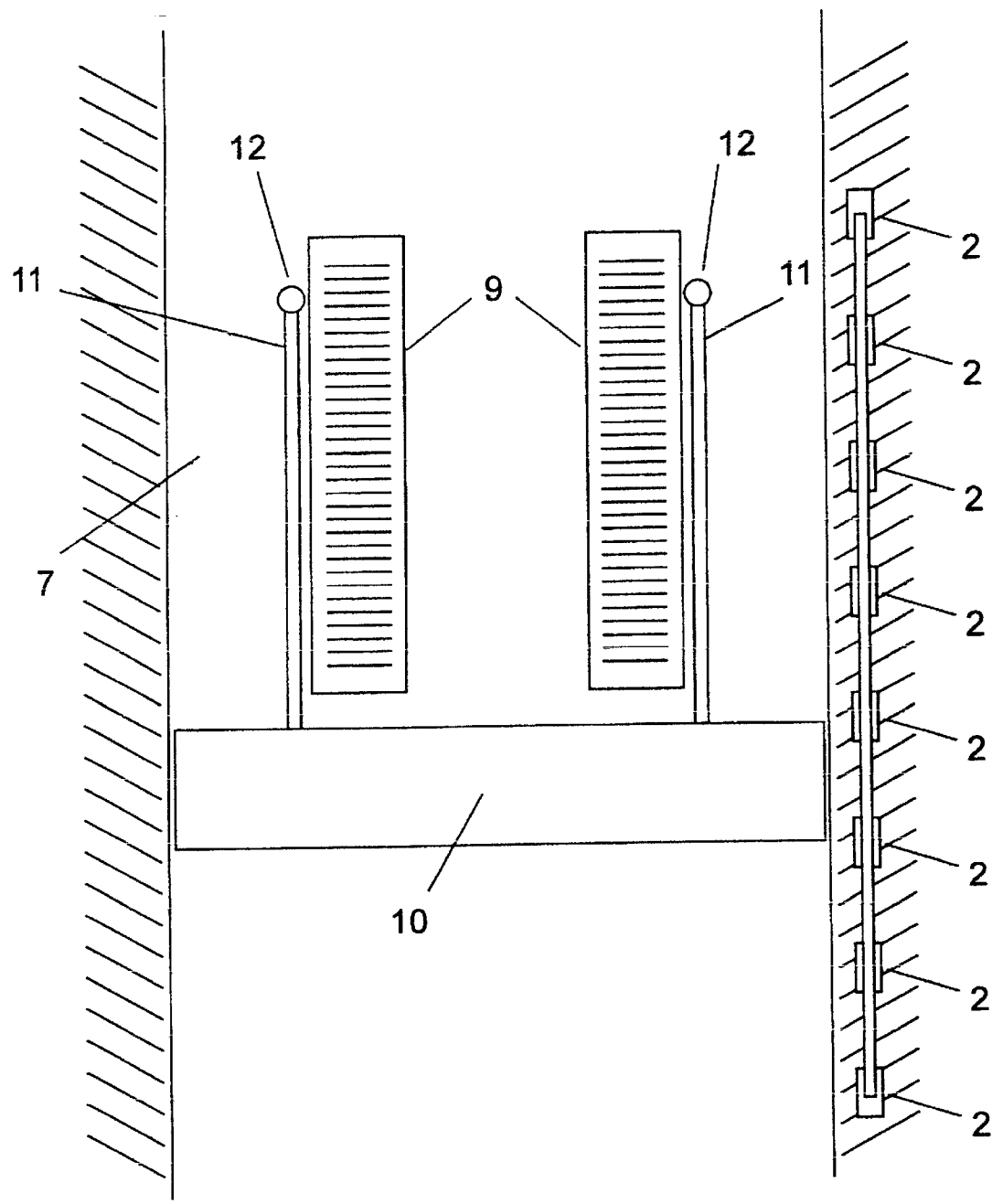
FIG. 3 shows the combination of FIG. 2 in top view.

FIG. 3 shows the combination of FIG. 2 in top view.

The above listed drawbacks of the prior art contour-measuring device will be immediately apparent from FIG. 1–3.

Figure 4:
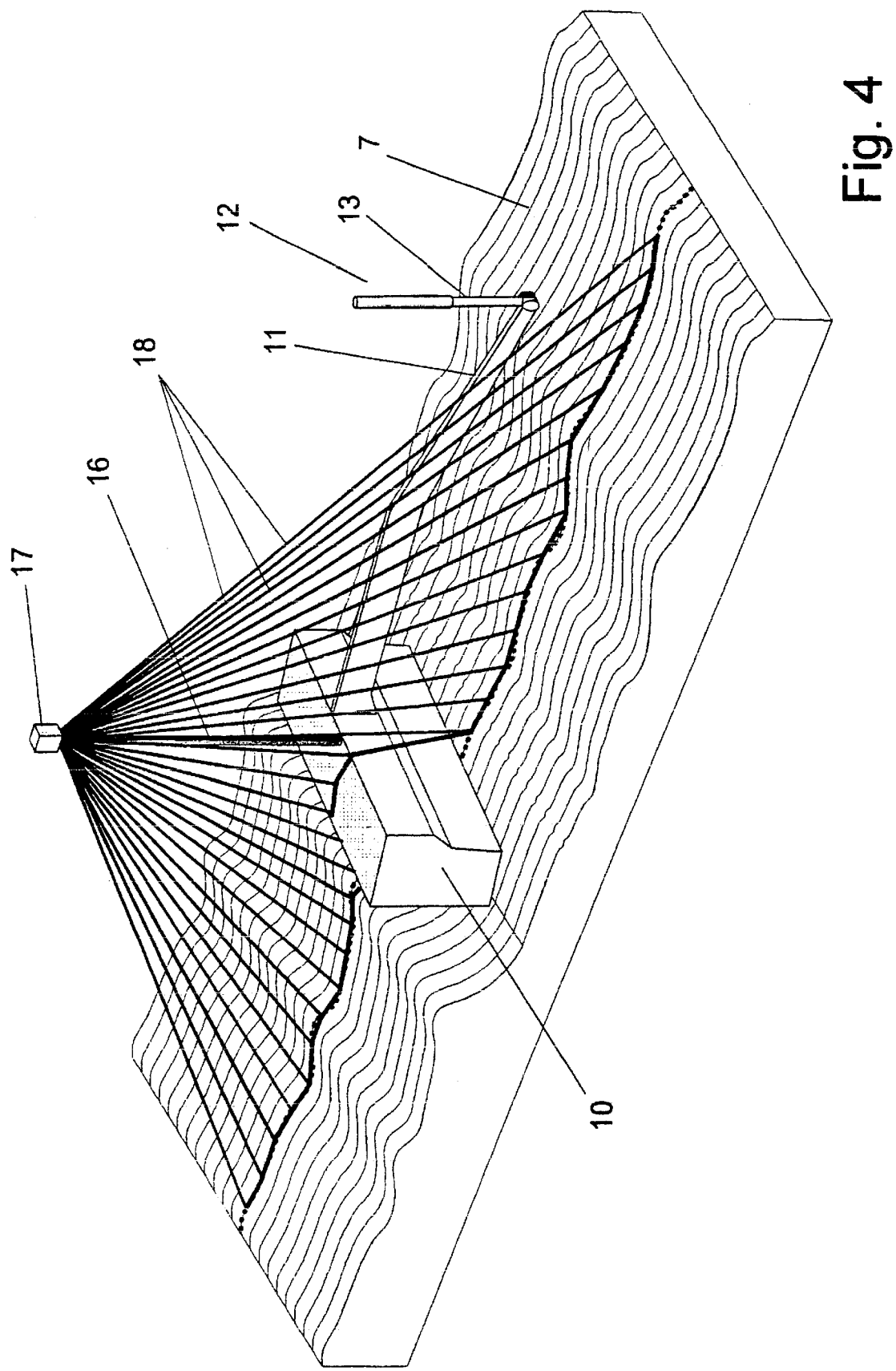
FIG. 4 shows schematically in perspective view an example of a contour-measuring device according to the invention for a first application in combination with several parts of an asphalt spreader above a road surface for asphalting.

FIG. 4 is a greatly simplified view of the application of a contour-measuring device according to the invention in combination with several parts of an asphalt spreader above a road surface for asphalting. Shown are a finishing beam 10 of an asphalt spreader (not further shown), which beam is moved along above a road surface 7 for asphalting by a pulling arm 11, a hydraulic cylinder 12 with piston rod 13 for the pulling arm 11 and a laser light source 17 which is mounted on a post 16 within the width range of finishing beam 10. Laser light source 17 is a laser measuring system (for instance the commercially available system from the producer Sick, type LMS200) which transmits a pulsed infrared laser light beam 18 which, using a rotating mirror, is deflected in steps of for instance 0.25° through an angle of for instance 100° to 180° over road surface 7. A sensor built into laser scanner 17 detects the part of a laser beam 18 reflected by road surface 7 and the distance between scanner 17 and the relevant point (i) on the road surface can be calculated from the transit time, from which distance and the scanning angle the relative distance $x_i$ and the relative height $z_i$ of a point i can be calculated. It can readily be appreciated that a scanner 17 at a height of for instance 2.5 m above road surface 7 at a scanning angle of 150° (75° in rearward and 75° in forward direction) covers a distance of a length of about 18.6 m over the road surface.

Figure 5:
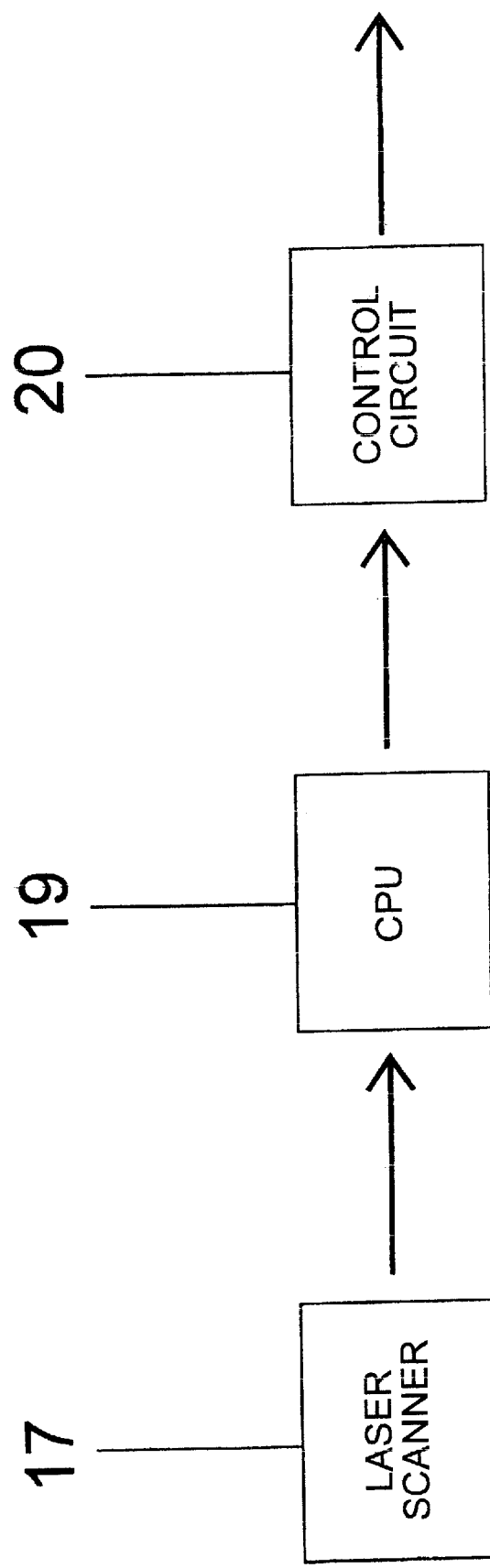
FIG. 5 shows a greatly simplified block diagram of the device of FIG. 4.

FIG. 5 is a block diagram of the circuit for processing the data collected by laser measuring system 17 of FIG. 4. The circuit successively comprises laser scanner 17, a central processing unit (CPU) 19 and a control circuit 20 for driving hydraulic cylinder 12. Using laser measuring system 17 actual values for the height $z_i^a$ for a very large number of points i on the road surface covered by the scanning laser beam are determined as a function of the actual location $x_i^a$ in a coordinate system co-displacing with scanner 17 and post 16. In CPU 19 values $z_i^c$ are calculated from these actual values $z_i^a$ for a desired contour of a road surface, wherein the calculated value for a point i' is determined from the actual value of a chosen number (n+m) of surrounding points. In the formula:

$$z_{i'}^c = z_{i'}^c(z_i^a(x_i^a)), \text{ wherein } i'-m<i<i'+n \qquad (I)$$

Using the CPU it is possible with a contour measuring device according to the invention to replace an actual value for the height of a point with a substitute value if this actual value exceeds a predetermined threshold value. A threshold value is for instance exceeded if a laser beam reflects from a component of the asphalt spreader, for instance on finishing beam 10. Owing to the possibility of recognizing incorrect measurement values, the laser scanner can be applied without problem within the width range of an asphalt spreader, whereby a more realistic picture can be obtained of the contour of a road surface for asphalting than is the case with the multi-foot ski.

Because the algorithm for calculating these values can be chosen, otherwise than in contour determination using a multi-foot ski, the desired contour is not however limited to a contour wherein the calculated height of a point i' is determined solely by the actual or substitute height of surrounding points, but this calculated height can be corrected, for instance in situations where the occurrence of a structural subsidence in a road surface must be compensated by arranging an overmeasure of asphalt. The value for the calculated height is in that case increased by a predetermined position-dependent term. In the formula:

$$z_{i'}^c = z_{i'}^c(z_i^a(x_i^a)) + \Delta z_{i'}^a(x_{i'}^a), \text{ wherein } i'-m<i<i'+n \qquad (II)$$

The desired calculated values $z_i^c$ for the height of the points i as a function of the position $x_i$ are fed to control circuit 20, where a control signal is generated for driving of cylinder 12.

Figure 6:
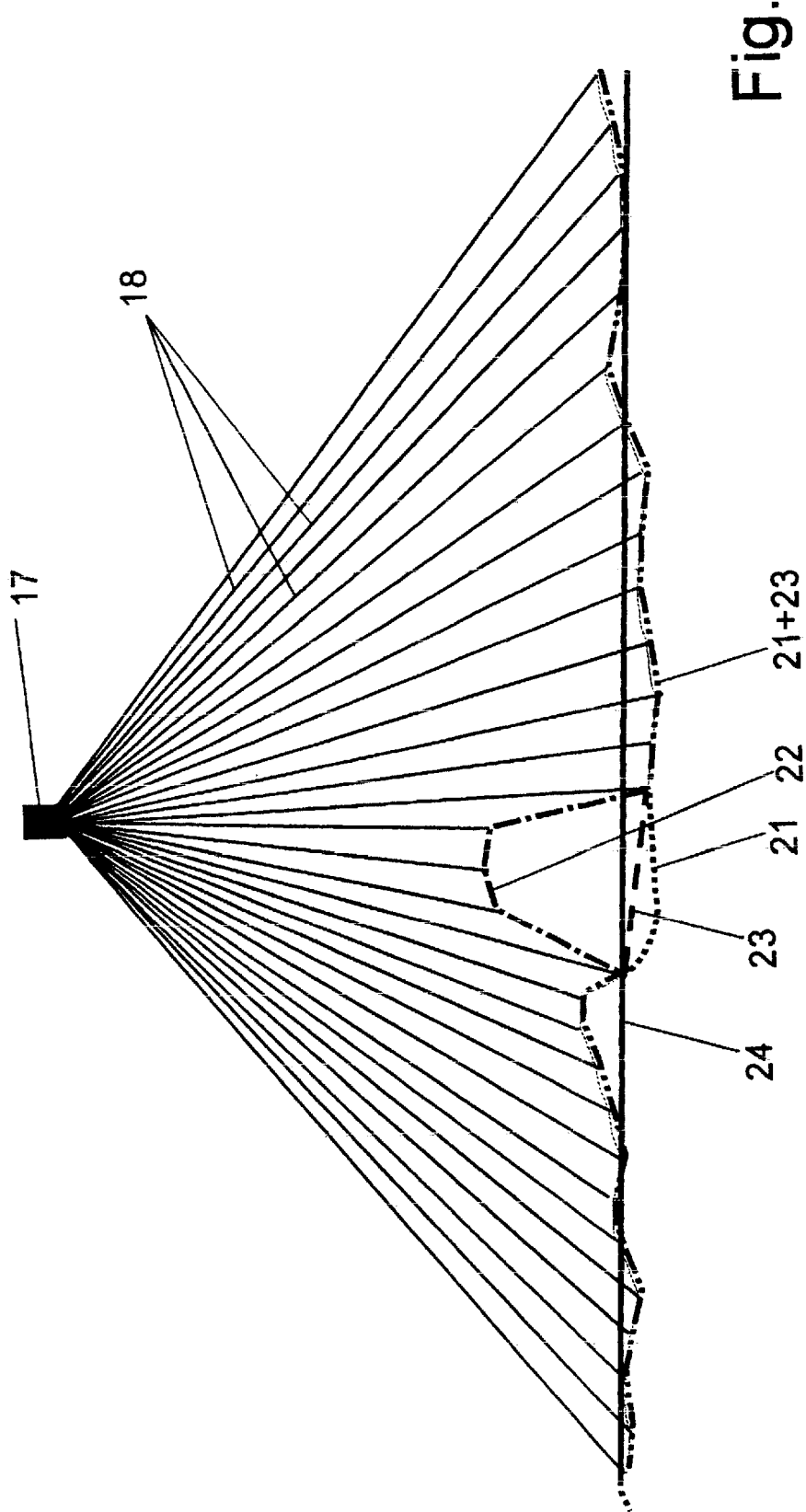
FIG. 6 shows a diagram of the progression of the laser beams transmitted by the laser scanner of FIG. 4 in combination with the actual contour and a number of contours determined using the measuring device.

FIG. 6 shows a diagram of the progression of the laser beams 18 transmitted by laser scanner 17 of FIG. 4 in combination with the actual contour, the contour 22 measured by laser scanner 17 and giving an image of the actual contour of the road surface which is disturbed by the reflections from finishing beam 10, the actual contour 23 corrected using CPU 19 and the desired contour 24 which is calculated with CPU 19 and which functions as input signal for control circuit 20.

Figure 7:
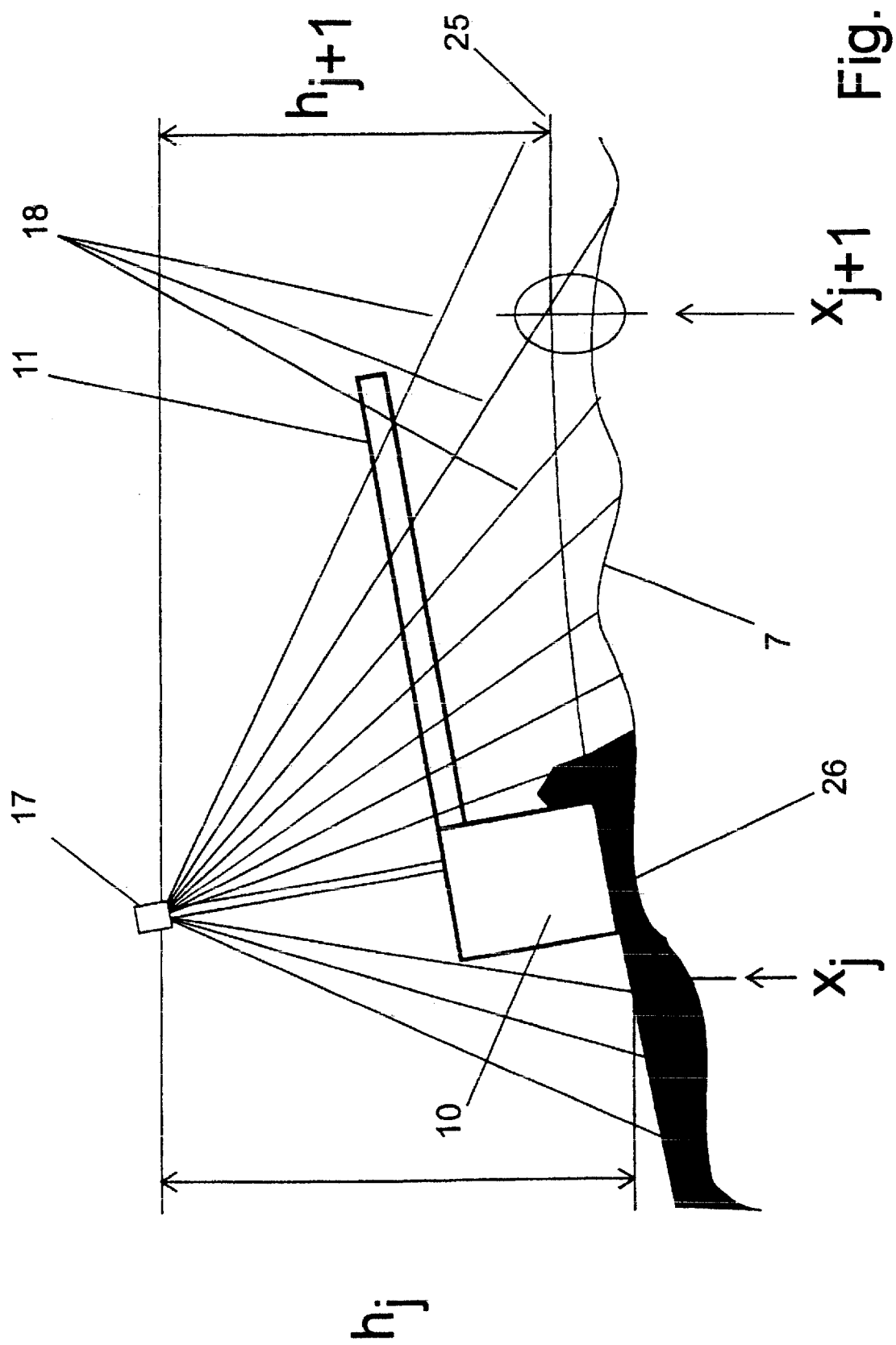
FIG. 7 shows schematically in side view an example of a contour-measuring device according to the invention for a second application in combination with several parts of an asphalt spreader above a road surface for asphalting.

FIG. 7 is a greatly simplified view of a second application of a contour measuring device according to the invention in combination with several parts of an asphalt spreader above a road surface for asphalting. Shown in side view are a finishing beam 10 of an asphalt spreader (not further shown) moved along by a pulling arm 11 above a road surface 7 for asphalting and a laser scanner 17 mounted on a post 16. For the road surface the desired elevation $\Delta Y_j$ relative to the actual height $Y_j$ is predetermined in reference points $X_j$, while the desired elevation of the road surface located between two reference points is determined by a smooth line 25 connecting the two reference points for elevating. In the prior art this interpolation takes place in practice by manual intervention in the control circuit for a finishing beam. By entering the predetermined values $\Delta Y_j(X_j)$ in the memory of CPU 19 and programming this latter accordingly, the interpolation for the desired height of points between successive reference points $X_j$, $X_{j+1}$ can be supplied by the CPU. If the range of the laser scanner covers the distance between two successive reference points $X_j$, $X_{j+1}$, the actual height $h_{j+1}$ of a reference point relative to the height of the preceding reference point $h_j$, can be determined in each case, and the calculated values can be fed in real-time to control circuit 20 for finishing beam 10 of an asphalt spreader, so that manual intervention in the control of the finishing beam is unnecessary, so that asphalt 26 is deposited in fully automated manner along the desired contour 25.

It is pointed out that use of the invention is not limited to the combination with an asphalt spreader, but that the invented contour-determining device can likewise be applied in combination with other road-making machines such as graders and scarifiers, or can be used independently to determine a transverse contour of a road not closed to traffic, wherein disruptive reflections of laser beams from passing traffic play no part due to the possibility of being able to limit measurement signals by means of a threshold value.

What is claimed is:

1. Device for determining a desired contour of a ground surface relative to the actual contour of that ground surface, at least comprising measuring means for generating along a determined distance from a ground surface actual values for the height and position of a number of points of that ground surface relative to a determined reference point, characterized in that the measuring means comprise

- a laser light source which can be placed at a measuring point above the ground surface and which is adapted to generate a laser beam moving over said determined distance from the ground surface,
- sensor means for detecting the laser beam reflected by the ground surface to the measuring point,
- time-measuring means for determining the transit time of said laser beam between the laser light source and the sensor means, and
- processing means for generating from signals from the laser light source, the sensor means and the time-measuring means of actual values for the height and the position of a number of points of this ground surface relative to the measuring point, and for calculating from these actual values of values for height and position of a number of points on a desired contour of this ground surface.

2. Device as claimed in claim 1, characterized in that the processing means (19) are adapted to separately calculate for each of the number of points on a desired contour of the ground surface the values for height and position of these points.

3. Device as claimed in claim 1 or 2, characterized in that the processing means (19) comprise memory means for storing values for the actual position ($X_j$, $X_{j+1}$) of a number of predetermined points of a ground surface and the predetermined value for the desired height ($h_j$, $h_{j+1}$) of these points, and the processing means (19) are adapted to calculate the value for a desired height of points located between these predetermined points ($X_j$, $X_{j+1}$) compatible with this predetermined value for the desired height of these points.

4. Device as claimed in claim 1, characterized in that the processing means (19) are adapted for feeding the calculated values for height and position of a number of points on a desired contour of said ground surface to a control circuit (20) of the finishing beam (10) of an asphalt spreader.

* * * * *